Feb. 11, 1969 A. R. PASSARELLO 3,426,742
COMBINED INTAKE AND EXHAUST MECHANISM FOR HEATING UNIT
Filed Dec. 5, 1966
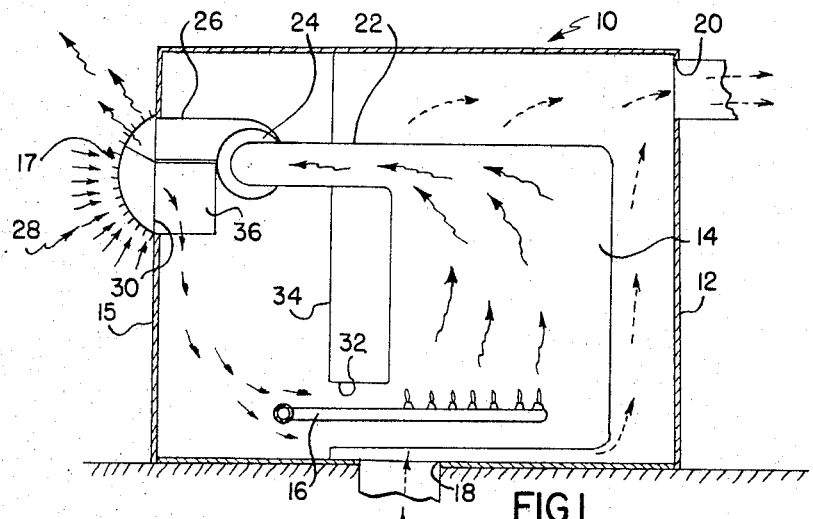
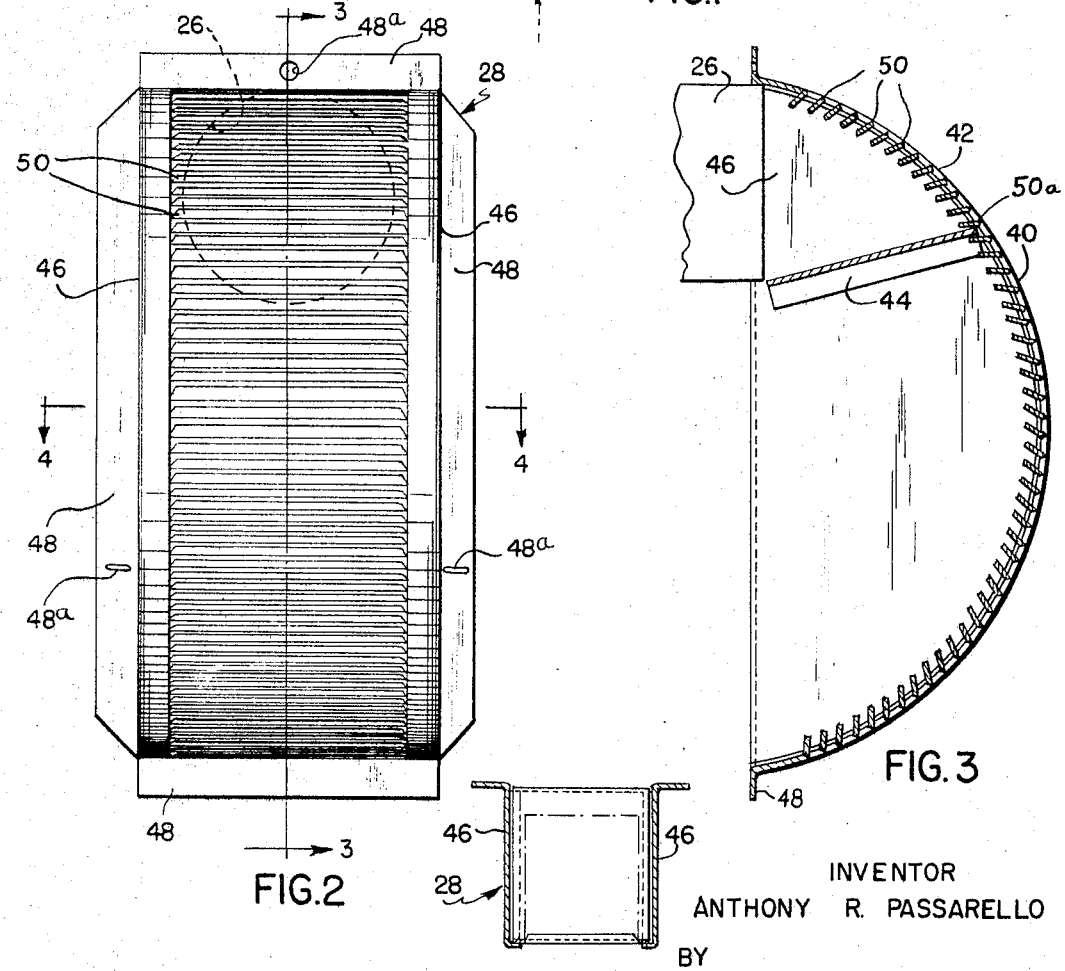
INVENTOR
ANTHONY R. PASSARELLO
BY
Baldwin, Doran & Egan
ATTORNEYS

United States Patent Office 3,426,742
Patented Feb. 11, 1969

---

3,426,742
COMBINED INTAKE AND EXHAUST MECHANISM FOR HEATING UNIT
Anthony R. Passarello, Bellevue, Ohio, assignor to Johnson Corporation, Bellevue, Ohio, a corporation of Ohio
Filed Dec. 5, 1966, Ser. No. 599,144
U.S. Cl. 126—85                                6 Claims
Int. Cl. F24c *3/00;* F23l *17/04*

This invention relates in general to improvements in heating units, and more particularly to a combined intake and exhaust mechanism for a heating unit, wherein the intake air for combustion purposes is drawn into the heating unit and is combined with fuel and burned, and the gases of combustion are then returned back to the same general area as the intake for exhaust to the atmosphere.

It is known in the prior art to have a combined cold air intake and combustion gas exhaust type of mechanism for a heating unit. One type of such prior art mechanisms comprises for instance, concentric pipes leading outdoors from the heating unit. One of the pipes is adapted for conveying hot gases of combustion to the outside atmosphere while the other pipe is adapted for drawing in cold air for the combustion of the fuel. However, such arrangements generally consume considerable space and have not been found to be altogether satisfactory.

The present invention provides a novel combined intake and exhaust arrangement for a heating unit wherein such heating unit includes an opening therein through which intake air is drawn for mixing with the fuel to support combustion, and then the hot combustion gases are utilized in heating air for subsequent transmittal to the area to be heated, after which the cooled gases of combustion are directed back to the same general location as the air intake and wherein at such location there is provided a structure for separating and maintaining separate the intake air from the exiting combustion air.

Accordingly, an object of the invention is to provide a novel combined intake and exhaust arrangement for a heating unit or the like.

Another object of the invention is to provide a compact combined intake and exhaust mechanism for a heating unit and wherein such combined mechanism includes a grille structure adapted for attachment to the housing of the heating unit, for maintaining separate the intake air from the exhaust combustion gases.

A further object of the invention is to provide a combined intake and exhaust arrangement of the above discussed type which includes an arcuate shaped, in side elevation, grille having a lower air intake portion and an upper combustion gas exhaust portion, with means dividing such portions from one another, and with such grille being adapted for ready attachment to the housing of the heating unit.

A still further object of the invention is to provide a heating unit having a combined air intake and gas combustion exhaust mechanism mounted thereon, for expeditiously providing for the drawing of combustion air into the heating unit, and providing for exhausting gases of combustion substantially at the same location on the heating unit housing, and which combined intake-exhaust mechanism includes means for maintaining the separation of the intake air from the exhaust combustion gases.

A still further object of the invention is to provide a combined intake-exhaust mechanism for use on a heating unit which is compact in construction and economical to manufacture.

Other objects and advantages of the invention will be apparent from the following description taken in conjunction with the accompanying drawing wherein:

FIGURE 1 is a diagrammatic sectional illustration of a heating unit having the intake-exhaust mechanism of the invention mounted thereon;

FIGURE 2 is a front elevational view of the intake-exhaust grille illustrated diagrammatically in FIGURE 1;

FIGURE 3 is a sectional view taken generally along the plane of line 3—3 of FIGURE 2; and FIGURE 4 is a reduced size sectional view taken generally along the plane of line 4—4 of FIGURE 2 looking in the direction of the arrows.

Referring now again to the drawings, there is illustrated a heating unit 10 having a housing 12 in which is disposed a combustion chamber 14, and fuel furnishing means 16 which may be of conventional type, which is adapted to furnish fuel for combining with intake air (designated by the straight full-line arrows) for burning of the fuel and air, to heat the combustion chamber.

The heating unit 10 may be of the type which is adapted for mounting on a building or other support exteriorly of the building or area which is to be heated, or at least the outer wall 15 of the housing 12 is adapted to be exposed to the exterior atmosphere. The intake-exhaust mechanism 17 of the invention provides an arrangement wherein the intake air for supporting the combustion of the fuel used in the furnace is drawn into the furnace at approximately the same location that the combustion gases are exhausted from the heating unit, while maintaining such intake air and exhaust gas separate.

The air to be heated and subsequently used for heating a building or other area is designated by the phantom line arrows and may enter housing 12, as at 18, pass about the exterior of the combustion chamber 14, whereupon the air is heated, and with such heated air exiting at for instance 20, to be directed to the area or building that is to be heated by heating unit 10. The hot gases of combustion (designated by the wavey-line arrows) in heating chamber 14, after being cooled by the heating air (phantom-line arrows) may pass through pipe or passageway 22 as urged by the exhaust fan or blower 24 of conventional type and then are directed to passageway or pipe 26 back to the exterior wall 15 of the heating unit housing 12.

The intake combustion air (full line arrows) may enter through a grille-like shield 28 as shown in FIGURE 1, pass through an opening 30 in the housing wall 15 and due to the draft produced by fan 24, moves downwardly through opening 32 in the heating unit partition 34, and into the combustion chamber 14 to support combustion. It is preferable that the air as it enters through the openings defined, in the embodiment illustrated, by the louvers of grille 28, be directed downwardly, and for instance as by means of a downwardly opening baffle chute 36, which baffle chute may extend just below the lower extremity of opening 30 in the heating unit housing 12. Baffle 36 may be closed on the sides thereof as diagrammatically shown in FIGURE 1.

Referring now in particular to FIGURES 2, 3 and 4, it will be seen that grille or shield 28 is, in the embodiment illustrated, of arcuate shape in side elevation and may be conveniently formed of metallic material, such as sheet metal or the like. Such grille is divided into two sections, a lower air intake section 40, and an upper combustion gas exit section 42. Air intake section 40 as can be seen in FIGURE 3, is of substantially greater size than the combustion gas exiting section 42, and thus the velocity of such exiting combustion gases is maintained greater or even increased as it passes through section 42, to thus be directed outwardly further away from the intake air. This aids in preventing mixing of the intake air with the exiting combustion gases.

A baffle plate 44 attached to the side walls 46 of the grille and extending therebetween in bridging relationship, separates the air intake section 40 from the exhaust section 42. Such baffle 44 is preferably obliquely disposed with respect to the horizontal and slopes upwardly, to divide the air intake portion 40 from the combustion gas outlet portion 42. The grille 28 preferably includes flange portions 48 having means such as openings 48a therein for attaching the grille to the exterior wall 15 of the heating unit, in enclosing relation to opening 30 therethrough. As can be best seen in FIGURE 3, the louvers 50 including baffle plate engaging louver 50a in the exit section 42, are all disposed obliquely with respect to the horizontal and extend generally upwardly in an outward direction, so as to cause the combustion gases to be directed generally upwardly with respect to the horizontal as they exit through grille section 42. The louvers in the lower air intake section 40 commencing adjacent louver 50a may be generally horizontal and then tip downwardly progressively along the arcuate periphery of the grille. The extent of the arcuate periphery of grille section 40 is preferably about two and one-half times the extent of the arcuate periphery of grille section 42, resulting in the aforementioned maintenance of or increase in the velocity of the exiting combustion gas.

From the aforegoing discussion and accompanying drawings it will be seen that the invention provides a novel combined intake and exhaust arrangement for a heating unit and which includes a grille-like arragement for shielding the vent pipe and the intake air opening of the heating unit, with the grille being divided into an intake section and a combustion gas exit section, with means dividing such sections from one another, and in a manner for maintaining separate the intake air from the exhaust gas.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

I claim:

1. In a heating unit comprising a housing having a generally vertical exterior wall, a combustion chamber in said housing, a combustion air inlet in said wall communicating with said chamber, means for exhausting the gas of combustion from said chamber, the last mentioned means comprising a combustion gas passageway from said chamber toward said wall to substantially the same location on said wall as said air inlet, blower means for causing circulation of combustion air through said air inlet to the combustion chamber and circulation of the gas of combustion out said combustion gas passageway to the exterior of said housing, said passageway including a duct terminating adjacent the exterior of said wall at said air inlet, and means at said location for maintaining separate the inlet air from the exhaust combustion gas during ingress and egress of respectively said air and combustion gas, the last mentioned means comprising a shield-like member secured to the exterior of said housing at said location and encompassing said air inlet and the exit end of said duct, said member being adapted for exposure to the atmosphere, said member comprising, an arcuate-shaped apertured front wall and generally vertically oriented laterally spaced side walls connected to said front wall, imperforate means extending between said front and side walls and dividing the interior of said member into an upper exhaust section and a lower air intake section, said imperforate means coacting with the exit end of said duct for separating the gas of combustion exiting via said passageway into said member from inlet air adapted to enter said member, said front wall comprising a plurality of generally transversely extending louvers providing said apertures in said front wall, said member being generally symmetrical about the horizontal center-plane of said member except for said imperforate means, with generally equal numbers of said louvers being disposed on opposite sides of said horizontal center plane and in corresponding locations with respect to the arcuate periphery of said front wall, said louvers in the exhaust section portion of said front wall being disposed obliquely with respect to the horizontal and sloping generally upwardly in a direction outwardly of said member, said louvers in the intake section portion of said front wall being disposed generally obliquely with respect to the horizontal and sloping generally downwardly in a direction outwardly from said member, for respectively urging the incoming inlet air and the outgoing combustion gases into generally radial separation with respect to one another, said exhaust section of said member being substantially smaller than said inlet section for increasing the exiting velocity of combustion gas from said member.

2. A heating unit in accordance with claim 1, wherein said imperforate means comprises a generally planar baffle plate bridging said side walls of said member and disposed obliquely with respect to the horizontal so as to extend upwardly in a direction outwardly of said member.

3. A heating unit in accordance with claim 2 wherein the extent of the arcuate periphery of said intake section portion of said front wall is approximately two and one half times the extent of the arcuate periphery of said exhaust section portion of said front wall.

4. A heating unit in accordance with claim 3 wherein the vertical distance from the inner transverse horizontal edge of said baffle plate to the upper interior surface of said exhaust section portion of said front wall is substantially the same as the height of said exit end of said duct, said louvers in said exhaust section portion of said front wall commencing at a point downwardly from the top extremity of said front wall.

5. A heating unit in accordance with claim 4 wherein said member is formed of sheet metal and includes laterally projecting flanges disposed about the rearward periphery thereof, at least certain of said flanges having means thereon for attaching said member to said wall of said housing in encompassing relation to said air inlet and said exit end of said duct.

6. A combined air intake-exhaust device comprising, a shield-like member adapted for being mounted in encompassing relation to an opening in a vertical exterior wall of a housing of a heating unit, said shield-like member being adapted for exposure to the atmosphere and being operative to maintain separate inlet air from exhaust combustion gas exiting from a duct extending to the upper portion of said opening from the combustion chamber of the heating unit, during ingress and egress of respectively the inlet air and the combustion gas, said member being of arcuate configuration in side elevation and comprising an arcuate shaped apertured front wall and generally vertically oriented laterally spaced side walls connected to said front wall, means extending laterally from said member at the rearward periphery thereof for attaching said member to the housing of the heating unit, an imperforate baffle plate bridging said side walls and extending to said front wall and dividing the interior of said member into an upper exhaust section and a lower air intake section, said baffle plate being adapted to coact with the exit end of said duct for maintaining the gases of combustion from the duct separate from inlet air adapted to enter said member, said front wall comprising a plurality of generally transversely extending louvers providing the apertures in the front wall, said member being generally symmetrical about the horizontal center plane thereof except for said baffle plate with generally equal numbers of the louvers being disposed on opposite sides of the center plane and in corresponding locations with respect to the arcuate periphery of said front wall, said louvers in the exhaust section portion of the front wall being disposed obliquely with respect to the horizontal and sloping generally upwardly in a direction outward from said member, said louvers in the intake section portion of said front wall being disposed generally obliquely with respect to the horizontal and sloping downwardly in a direction outwardly from said member, for respectively urging incoming air and outgoing combustion gas into generally radial separation with respect to one another, said exhaust section of said member being substantially smaller as compared to said inlet section for increasing the exiting velocity of combustion gas from said member, the extent of arcuate periphery of said intake section portion of said front wall being approximately 2½ times the extent of arcuate periphery of the exhaust section portion of said front wall.

References Cited

UNITED STATES PATENTS

| | | | |
|---|---|---|---|
| 2,659,294 | 11/1953 | Hersperger | 98—94 |
| 2,919,690 | 1/1960 | Horn | 126—85 |

FOREIGN PATENTS

| | | |
|---|---|---|
| 859,308 | 1/1961 | Great Britain. |
| 912,724 | 12/1962 | Great Britain. |

F. KITTERER, *Primary Examiner.*